(12) United States Patent
Dell

(10) Patent No.: US 9,194,438 B2
(45) Date of Patent: Nov. 24, 2015

(54) DECOUPLER

(75) Inventor: James W. Dell, Newmarket, CA (US)

(73) Assignee: LITENS AUTOMOTIVE PARTNERSHIP, Woodbridge, Ontario (CA)

( * ) Notice: Subject to any disclaimer, the term of this patent is extended or adjusted under 35 U.S.C. 154(b) by 53 days.

(21) Appl. No.: 14/342,696

(22) PCT Filed: Sep. 6, 2012

(86) PCT No.: PCT/CA2012/000827
§ 371 (c)(1),
(2), (4) Date: Mar. 4, 2014

(87) PCT Pub. No.: WO2013/033825
PCT Pub. Date: Mar. 14, 2013

(65) Prior Publication Data
US 2014/0209428 A1    Jul. 31, 2014

Related U.S. Application Data

(60) Provisional application No. 61/531,603, filed on Sep. 6, 2011.

(51) Int. Cl.
*F16D 7/02* (2006.01)
*F16D 41/20* (2006.01)
*F16F 15/123* (2006.01)
*F16H 55/36* (2006.01)

(52) U.S. Cl.
CPC .............. *F16D 7/022* (2013.01); *F16D 41/206* (2013.01); *F16F 15/1232* (2013.01); *F16H 2055/366* (2013.01)

(58) Field of Classification Search
CPC ....................................... F16D 7/022
See application file for complete search history.

(56) References Cited

U.S. PATENT DOCUMENTS

| | | | |
|---|---|---|---|
| 3,618,730 A | 11/1971 | Mould, III | |
| 4,460,076 A | 7/1984 | Yamada | |
| 5,139,463 A | 8/1992 | Bytzek et al. | |
| 6,083,130 A | 7/2000 | Mevissen et al. | |
| 7,153,227 B2 | 12/2006 | Dell et al. | |
| 8,863,925 B2 * | 10/2014 | Antchak et al. | 192/41 S |

FOREIGN PATENT DOCUMENTS

| | | |
|---|---|---|
| WO | 2004/070225 A1 | 8/2004 |
| WO | 2005/028899 A1 | 3/2005 |
| WO | 2007/121582 A1 | 11/2007 |
| WO | 2010/099605 A1 | 9/2010 |
| WO | 2012/094745 A1 | 7/2012 |

OTHER PUBLICATIONS

PCT/CA2012/000827, International Search Report, Jan. 2, 2013.

* cited by examiner

*Primary Examiner* — Richard Lorence
(74) *Attorney, Agent, or Firm* — Millman IP Inc.

(57) ABSTRACT

A decoupler that includes a drive member, a hub and an isolator that is configured to transmit rotary power between the drive member and the hub in a predetermined rotational direction. The isolator includes a wrap spring, a plurality of helical coil springs, and a carrier assembly. The wrap spring includes a plurality of helical coils and a proximal end. The helical coil springs are disposed between the hub and the carrier assembly. The carrier assembly includes a carrier plate and a spring shell. The carrier plate has a plate member with a rim and a spring groove. The rim abuts an axial end of the wrap spring. The proximal end of the wrap spring is received in the spring groove. The spring shell is assembled to the carrier plate and has a toric inner surface into which the helical coil springs are received.

16 Claims, 9 Drawing Sheets

DECOUPLER

CROSS-REFERENCE TO RELATED APPLICATIONS

This application claims the benefit of U.S. Provisional Patent Application No. 61/531,603 filed Sep. 6, 2011, the disclosure of which is hereby incorporated by reference as if fully set forth in detail herein. The entire disclosure of the above application is incorporated herein by reference.

FIELD

The present disclosure relates to a decoupler.

BACKGROUND

Examples of known decouplers are described in WIPO Publication Nos. WO2004/070225, WO2005/028899 and WO2010/099605. While such decouplers are satisfactory for their intended use, such decouplers are nonetheless susceptible to improvement.

SUMMARY

This section provides a general summary of the disclosure, and is not a comprehensive disclosure of its full scope or all of its features.

In one form, the present teachings provide a decoupler that includes a drive member, a hub and an isolator that is configured to transmit rotary power between the drive member and the hub in a predetermined rotational direction. The isolator includes a wrap spring, a plurality of helical coil springs, and a carrier assembly. The wrap spring includes a plurality of helical coils and a proximal end. The helical coil springs are disposed between the hub and the carrier assembly. The carrier assembly includes a carrier plate and a spring shell. The carrier plate has a plate member with a rim and a spring groove. The rim abuts an axial end of the wrap spring. The proximal end of the wrap spring is received in the spring groove. The spring shell is assembled to the carrier plate and has a toric inner surface into which the helical coil springs are received.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
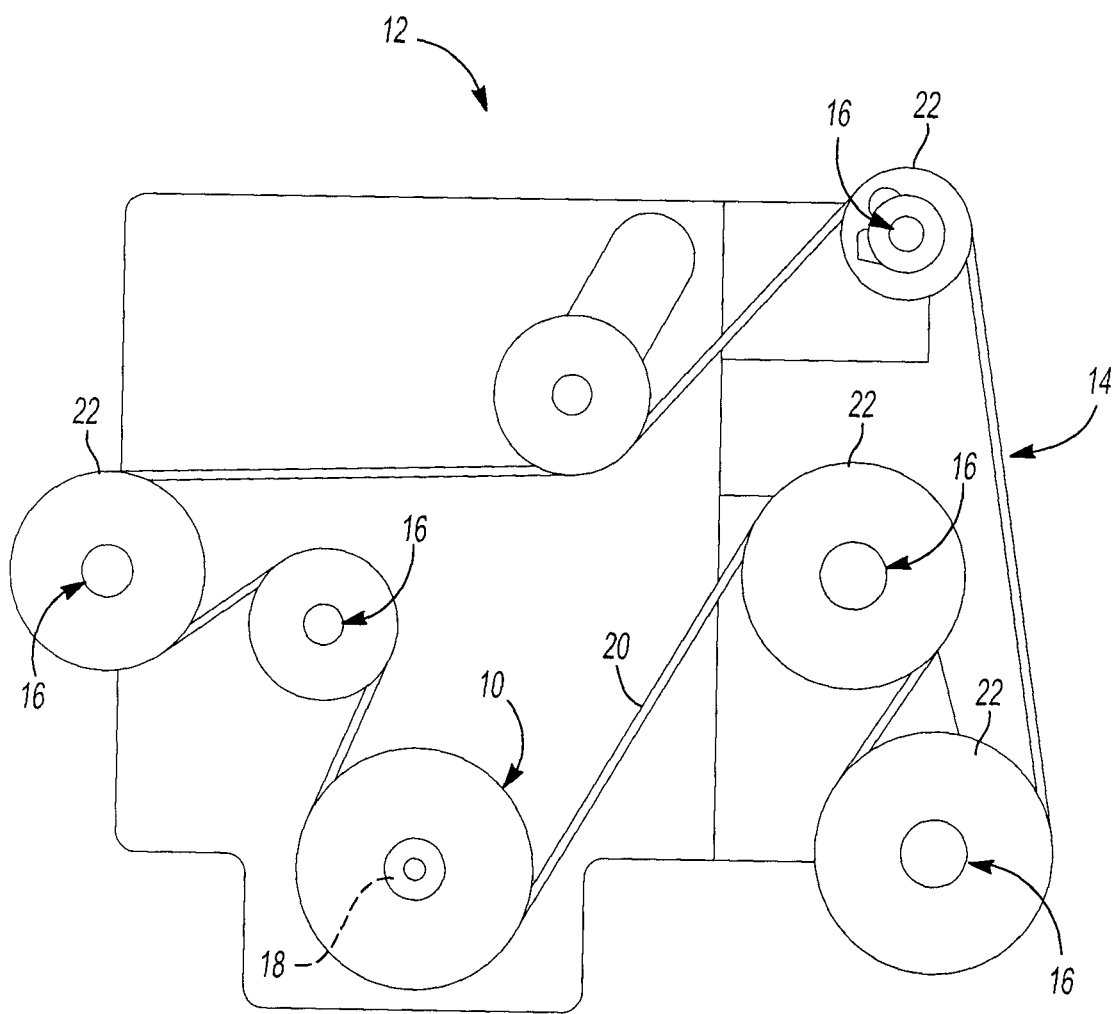
FIG. 1 is a schematic illustration of a decoupler constructed in accordance with the teachings of the present disclosure in operative association with an exemplary engine.

With reference to FIG. 1 of the drawings, a decoupler constructed in accordance with the teachings of the present disclosure is generally indicated by reference numeral 10. The decoupler 10 is shown in operative association with an automotive engine 12 that can include an accessory drive 14 having a plurality of engine accessories 16. In the particular example provided, the decoupler 10 is coupled to an output member (e.g., crankshaft) 18 of the engine 12 and transmits rotary power via an endless power transmitting element 20, such as a belt or a chain, to input members, such as pulleys or sprockets, to drive the engine accessories 16. It should be appreciated that while the decoupler 10 is illustrated in association with a front engine accessory drive, a decoupler constructed in accordance with the teachings of the present disclosure may be incorporated into various other devices in which a driven load is able at times to overspeed a source of rotary power. Consequently, it will be understood that the teachings of the present disclosure are not limited to the input member (e.g., pulley, sprocket, gear) of a power transmitting system having an endless power transmitting element (e.g., belt, chain, gear teeth), but rather could be incorporated into an output member (e.g., pulley, sprocket, gear) that receives rotary power from the endless power transmitting element.

Figure 2:
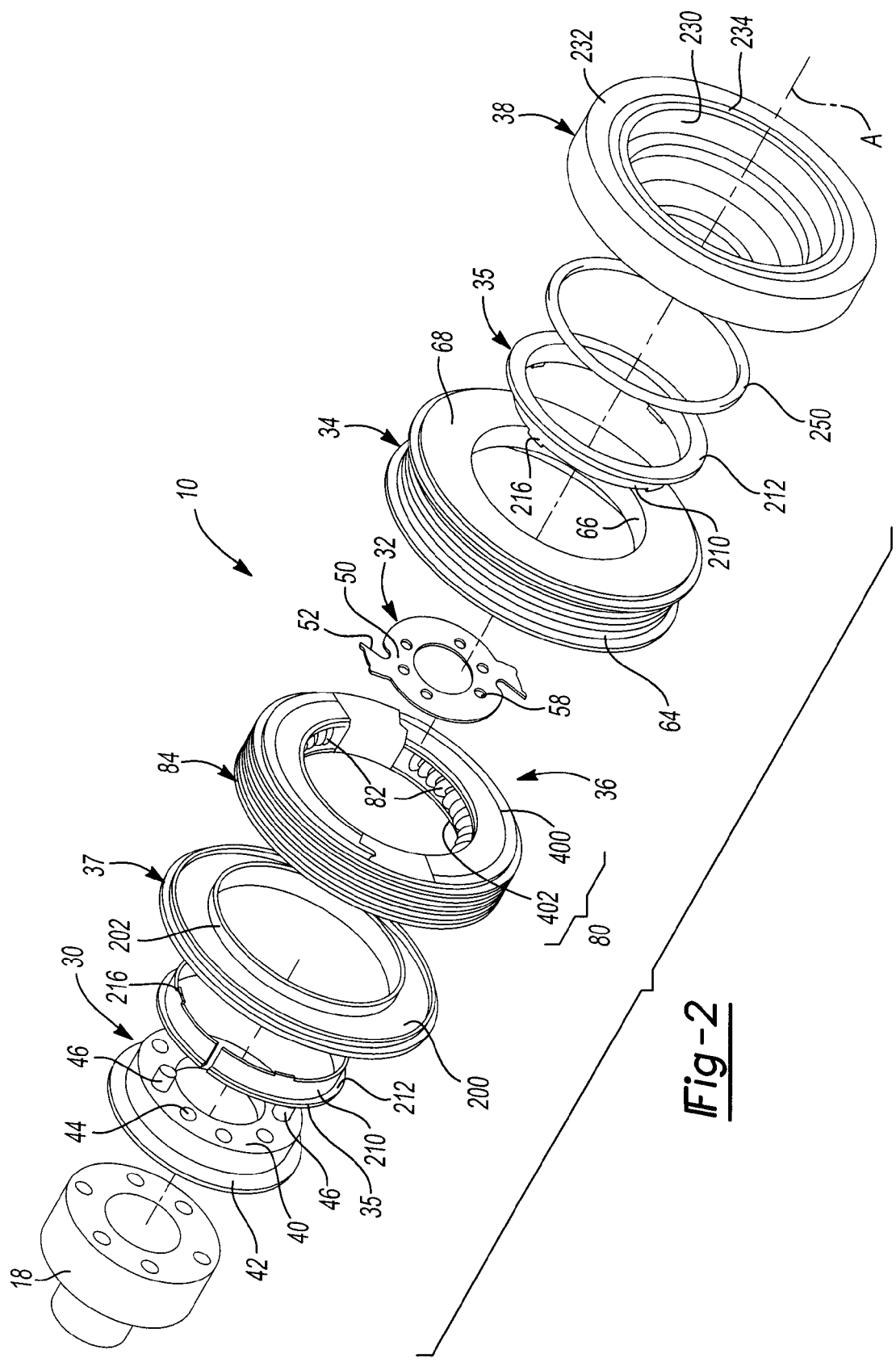
FIG. 2 is an exploded perspective view of the decoupler of FIG. 1.

With reference to FIG. 2, the decoupler 10 can be rotatable about an axis A and can include a hub spacer 30, a hub 32 a drive member 34, an isolator 36, a cover 37, a preload member 250, and a torsional vibration damper 38.

The hub spacer 30 can be abutted against an axial end of the crankshaft 18 and may be employed, if needed, to obtain a desired axial spacing between the crankshaft 18 and the hub 32 The hub spacer 30 can include an annular spacer body 40 and an annular spacer flange 42 that can extend radially outwardly from the spacer body 40. One or more bolt holes 44 can be formed through the spacer body 40 and if desired, one or more keying features, such as dowel pins 46, may be coupled to, formed in or formed by the spacer body 40 that can be employed to maintain a predetermined rotational orientation of the hub spacer 30 relative to the hub 32, the torsional vibration damper 38 and/or the crankshaft 18. For example, the dowel pins 46 could engage corresponding holes in the hub 32 and the torsional vibration damper 38. The dowel pins 46 could be staked after assembly to provide a means to secure the assembly prior to installation of the decoupler 10 to the engine 12 (FIG. 1).

The hub 32 can comprise an annular hub body 50 and a pair of hub tabs 52 that can extend radially outwardly from the hub body 50. The hub 32 can be formed of one or more components in any manner desired (e.g., stamping) and from a desired material. A plurality of holes 58 can be formed through the hub body 50 in a pattern that can mimic that of the holes 44 in the spacer body 40.

Figure 3:
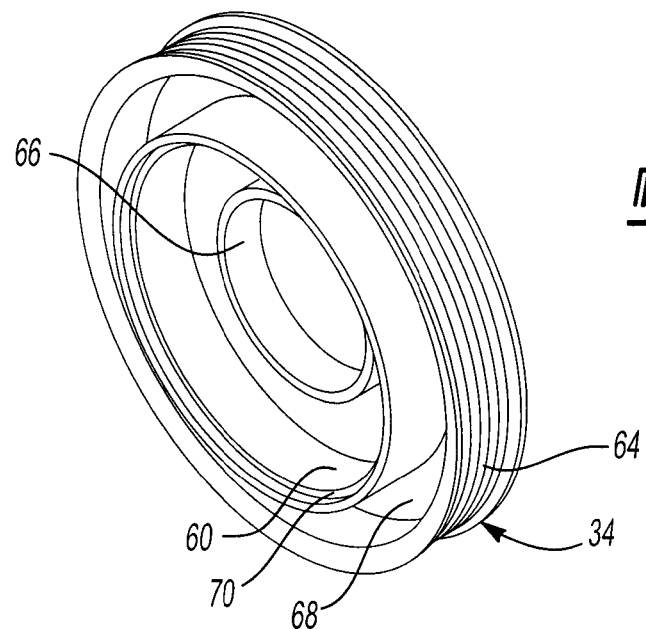
FIG. 3 is a rear perspective view of a portion of the decoupler of FIG. 1 illustrating a drive member in more detail.

With reference to FIGS. 2 and 3, the drive member 34 is configured to receive rotary power transmitted from the hub 32 through the isolator 36 and can comprise a clutch surface 60 that can be drivingly engaged by the isolator 36 to transmit rotary power therebetween. The clutch surface 60 may be heat treated and/or coated as desired. In the particular example provided, the clutch surface 60 is hardened and nitrided. The drive member 34 can comprise a circumferentially extending outer wall 64, a circumferentially extending inner wall 66, and an annular front wall 68 that can interconnect the outer and inner walls 64 and 66. The clutch surface 60 can be defined by an inside circumferentially extending surface of the outer wall 64, while an outside circumferentially extending surface of the outer wall 64 can be configured to engage the endless power transmitting element 20 (FIG. 1). In the example provided, the outside surface of the outer wall 64 is configured to engage a poly-V drive belt. The inner wall 66 can be concentric with the outer wall 64, but can extend axially rearward from the front wall 68 so as to be relatively shorter in the axial direction than the outer wall 64. A counterbore 70 can be formed into the front of the drive member 34 on a side opposite the rear wall 68.

Figure 4:
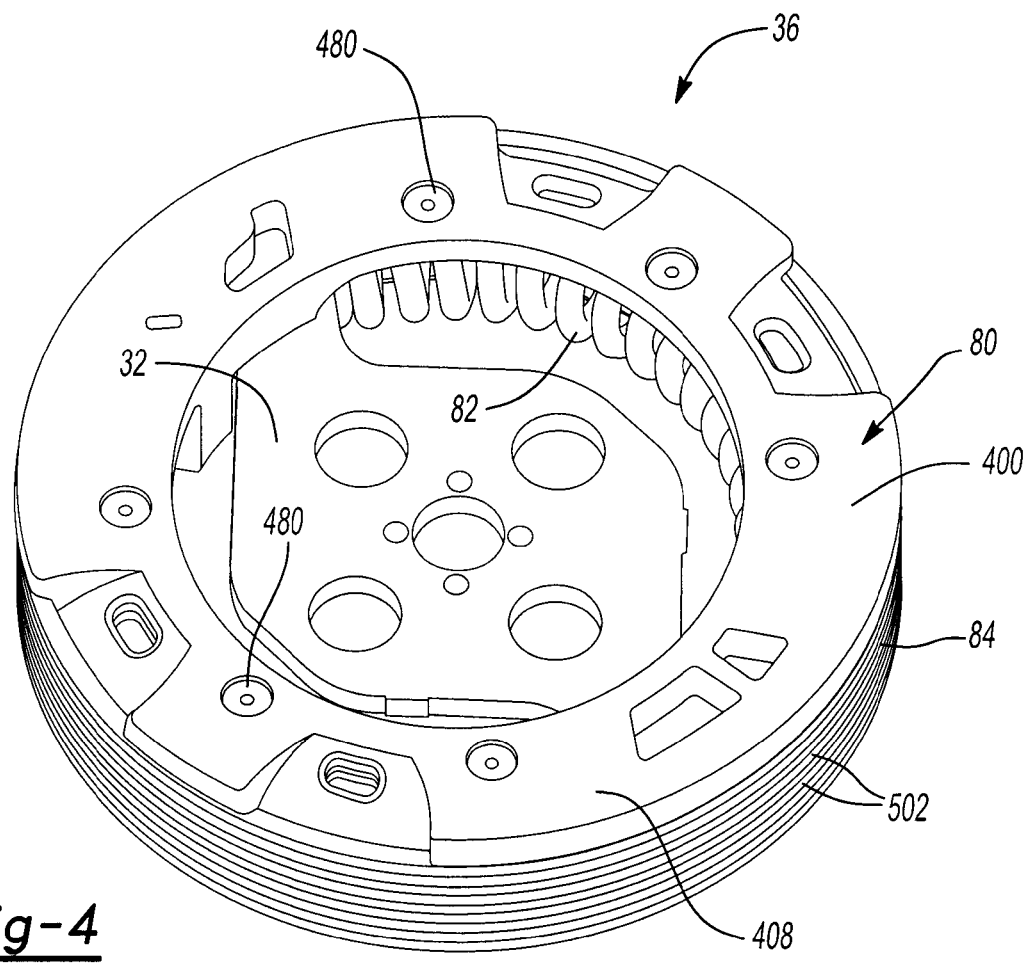
FIG. 4 is a front perspective view of a portion of the decoupler of FIG. 1 illustrating an isolator in more detail.
Figure 5:
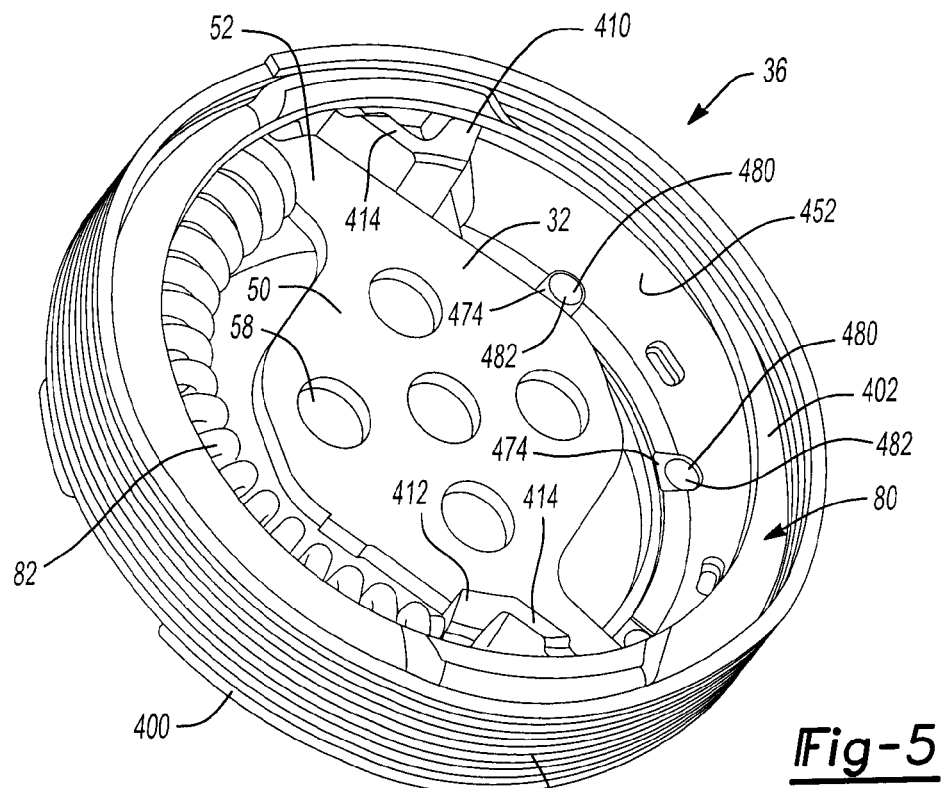
FIG. 5 is a rear perspective view of the isolator shown in FIG. 4.
Figure 6:
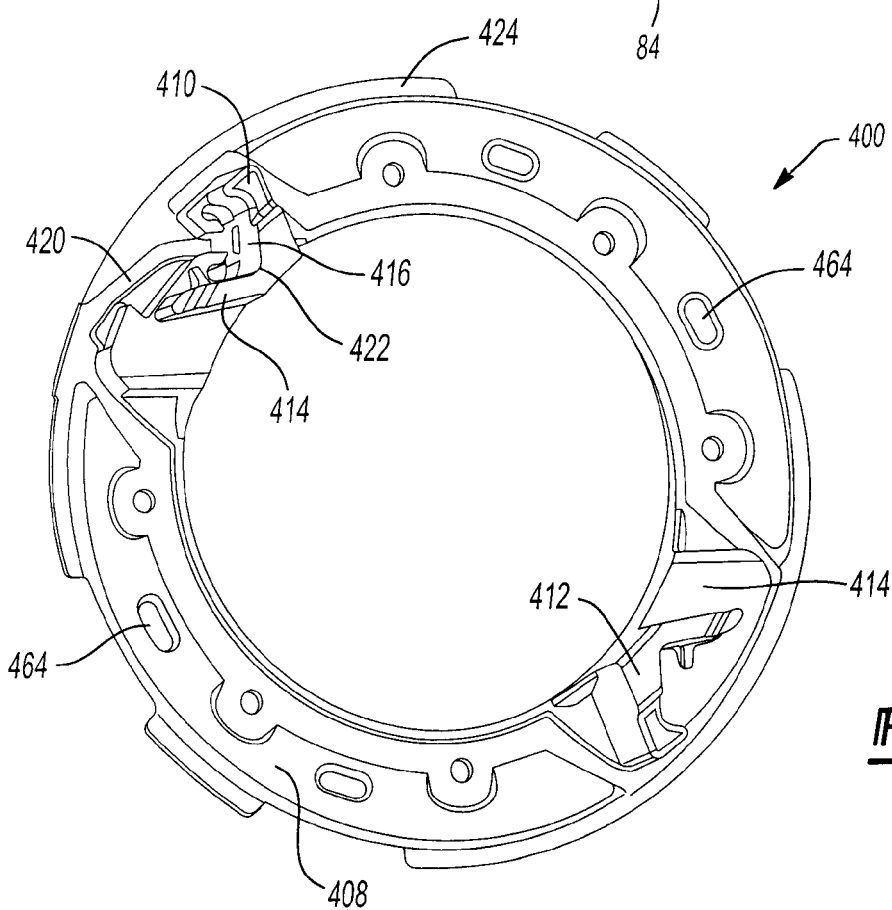
FIG. 6 is a front elevation view of a portion of the isolator shown in FIG. 4 illustrating a carrier plate in more detail.

With reference to FIGS. 2, 4 and 5, the isolator 36 can comprise a carrier assembly 80, a plurality of arcuate springs 82, and a wrap spring 84. The carrier assembly 80 can comprise a carrier plate 400, and a spring shell 402. With additional reference to FIG. 6, the carrier plate 400 can comprise a plate member 408, a first reaction block 410, a second reaction block 412, a pair of bumpers 414 and a clutch stop 416. The plate member 408 can be unitarily formed of a suitable material, such as Nylon 4/6 and can include a spring groove 420, a spring stop aperture 422 and a rim 424. Optionally, the first and second reaction blocks 410 and 412 and the bumpers 414 can be integrally and unitarily formed with the plate member 408. The clutch stop 416 can be received into the clutch stop aperture 422 and can be configured to abut an end of the wrap spring 84. In the particular example provided, the clutch stop 416 is a generally U-shaped steel stamping that is hardened.

Figure 7:
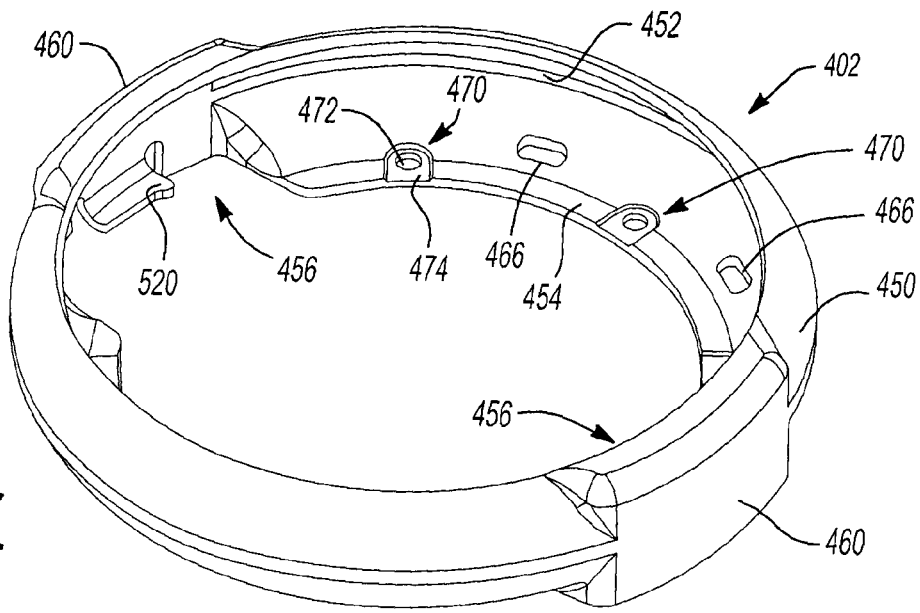
FIG. 7 is a perspective view of a portion of the isolator shown in FIG. 4 illustrating a spring shell in more detail.

With reference to FIGS. 5 and 7, the spring shell 402 can be formed from metal and can have a generally toric exterior surface 450 (i.e., an exterior surface 450 that is formed as a portion of the exterior surface of a torus), a generally toric interior surface 452 (i.e., an interior surface 452 that is formed as a portion of an interior surface of a torus) and an annular wall 454. A pair of block mounting apertures 456 can be formed in the spring shell 402; the block mounting apertures 456 can be sized to receive the first and second reaction blocks 410 and 412 and the bumpers 414. The carrier shell 402 can define a pair of support surfaces 460 that can be employed to aid in centering the carrier shell 402 relative to the wrap spring 84. The carrier shell 402 can be formed of a mild steel sheet metal in an appropriate manner, such as a progressive die. If desired, the carrier shell 402 can be heat treated and/or coated with a wear-resistant coating or finish. In the particular example provided, the carrier shell 402 is heat treated and nitrided, but it will be appreciated that a lubricious coating or material could be applied to all or a portion of the carrier shell 402, such as to the generally toric interior surface 452. Examples of suitable coatings include nickel plating and polytetrafluoroethylene (e.g., Teflon®) and examples of suitable materials include nylon. In instances where a grease or an oil are employed to lubricate the generally toric interior surface 452, various apertures 464 (FIG. 6) and 466 can be formed through one or both of the plate member 400 and the carrier shell 402, respectively, to facilitate the flow of lubricant into the interior of the carrier shell 402. A plurality of mounting recesses 470 can be formed into the annular wall 454. In the particular example, each of the mounting recesses 470 comprises a mounting aperture 472, which is formed through the annular wall 454, and a mounting slot 474 that is formed on the interior surface of the annular wall 454.

While the carrier shell 402 has been described as being unitarily formed, it will be appreciated that the carrier shell 402 could be formed by two or more components. For example, the carrier shell 402 could be generally formed by two half shells, which could be fabricated in a progressive die from sheet metal, and that the half shells could be fixedly coupled together in an appropriate process, such as welding (e.g., laser welding, friction welding).

With reference to FIGS. 4 and 5, the carrier plate 400 can be fixedly coupled to the carrier shell 402 in any desired manner, such as a plurality of threaded fasteners and/or a crimp ring. In the particular example provided, a plurality of rivets 480 are employed to fixedly couple the carrier plate 400 to the carrier shell 402. Each rivet 480 comprises a head 482 that is disposed in the mounting slot 474 in the carrier shell 402. The mounting slot 474 and the head 482 are sized such that the head 482 is disposed below (i.e., outwardly of) the generally toric interior surface 452 so that an associated one of the arcuate springs 82 does not rub against the rivet 480 during operation of the decoupler 10 (FIG. 2).

Figure 8:
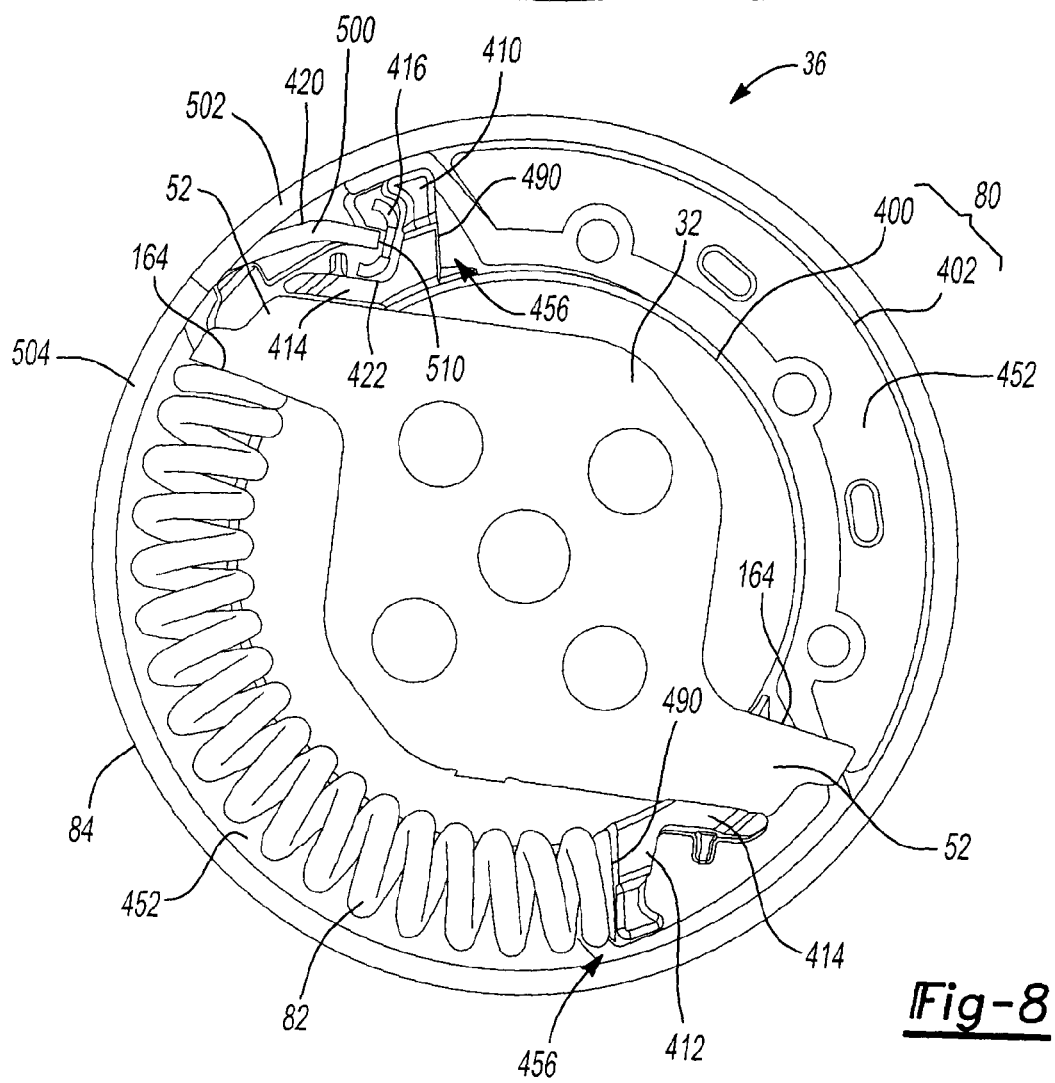
FIG. 8 is a section view of a portion of the isolator shown in FIG. 4.

With reference to FIG. 8, the first and second reaction blocks 410 and 412 can be formed of a desired material, such as nylon 4/6 and can be received into the block mounting apertures 456 and fixedly coupled to one or both of the plate member 400 and the carrier shell 402. The first and second reaction blocks 410 and 412 can comprise a first end surface 490 that is configured to abut an end of an associated one of the arcuate springs 82. In the example provided, the spring groove 420 is formed into the first reaction block 410 and the spring groove 420 terminates at the spring stop aperture 422. Features can be formed onto/into one or both of the first and second reaction blocks 410 and 412 to aid in rotationally balancing the carrier assembly 80 and/or to reduce the mass of the carrier assembly 80.

The bumpers 414 can be configured to aid in maintaining alignment of the arcuate springs 82 along a predetermined plane that extends through the center of the carrier shell 402 perpendicular to its rotational axis and/or to cushion the hub tabs 52 when the hub tabs 52 are rotated fully in an unloading direction via the biasing force of the arcuate springs 82.

The arcuate springs 82 can be helical coil springs and in the particular example provided, are also compression springs. It will be appreciated that with various modifications to the hub 32 and the carrier 80, the arcuate springs 82 could be tension springs (e.g., the carrier assembly 80 could be formed with a generally U-shaped groove formed into its outer surface for receipt of the arcuate tension springs). A first end of the arcuate springs 82 can be engaged to a driving surface 164 of an associated one of the hub tabs 52, while an opposite end of the arcuate springs 82 can be abutted against an associated one of the first and second reaction blocks 410 and 412. The arcuate springs 82 can bias the hub 32 in a rotational direction such that the hub tabs 52 abut the bumpers 414.

It will be appreciated that the arcuate springs 82 can abut the generally toric interior surface 452 of the carrier shell 402 and that if desired, a lubricant, such as an oil (e.g., conventional oil, synthetic oil, traction fluid) or a grease, can be employed to lubricate the generally toric interior surface 452. Additionally or alternatively, a coating or material may be applied to one or both of the generally toric interior surface 452 and the coils of the arcuate springs 82 to reduce friction and wear between the generally toric interior surface 452 and the arcuate springs 82.

The wrap spring 84 can comprise a proximal end 500, a plurality of helical coils 502 and a free end 504. The wrap spring 84 can be formed of a suitable material, such as a relatively hard spring steel wire, and can have an appropriate cross-sectional shape, such as a generally square or generally rectangular cross-sectional shape, in which the surfaces of the cross-sectional shape are generally flat or somewhat convex in shape. It will be appreciated, however, that the wire of the wrap spring 84 could have any desired cross-sectional shape, including a round cross-sectional shape. Moreover, the wire could be a "plain" wire, or could be coated with a desired coating (e.g., nickel plating) and/or can be lubricated with a desired lubricant, such as an oil (including conventional oils, synthetic oils and traction fluids) or a grease. The proximal end 500 can be shaped in a manner that is complementary to the shape of the spring groove 420 in the first reaction block 410. The proximal end 500 can terminate at an end face 510, which can be generally perpendicular to the longitudinal axis of the wire that forms the wrap spring 84. The proximal end 500 can be received into the spring groove 420 such that the end face 510 abuts the spring stop 416. In the particular example provided, the end face 510 abuts the spring stop 416 over a generally flat surface that is perpendicular to the longitudinal axis of the wire that forms the proximal end 500 of the wrap spring 84 such that the end face 510 contacts the spring stop 416 over the entire surface area of the end face 510, but those of skill in the art will appreciate that the spring stop 416 and/or the end face 510 may be constructed differently. The helical coils 504 can extend about the diameter of the carrier shell 402 such that the inside surface of the helical coils 504 can cooperate with the support surfaces 460 (FIG. 7) to roughly center the carrier shell 402 relative to the wrap spring 84. Moreover, the rim 424 (FIG. 6) on the plate member 408 (FIG. 6) can abut an axial end of the wrap spring 84 such that the wrap spring 84 is positioned axially relative to the carrier assembly 80 in a desired manner (e.g., such that the carrier shell 402 is centered along the length of the wrap spring 84). The helical coils 504 can be sized larger in diameter than the carrier shell 402 (i.e., such that the helical coils 504 do not directly contact the carrier shell 402), and somewhat larger in diameter than the clutch surface 60 (FIG. 3) on the drive member 34 (FIG. 3) to thereby engage the clutch surface 60 (FIG. 3) with an interference fit.

If desired, the carrier shell 402 can have a feature that can contact the proximal end 500 of the wrap spring 84 to inhibit the proximal end 500 from withdrawing from the spring groove 420 in a direction parallel to the rotational axis A (FIG. 2). In the particular example provided and with additional reference to FIG. 7, the carrier shell 402 comprises a blocking tab 520 (FIG. 7) that overlies and/or abuts a side of the proximal end 500 on a side opposite the carrier plate 400. The blocking tab 520 is integrally formed with and extends radially inwardly from the portion of the spring shell 402 that forms one of the block mounting apertures 456.

With renewed reference to FIG. 2, the cover 37 can include a flat and annular cover member 200 and an annular inner wall 202 that can extend forwardly from the cover member 200. The cover 37 can be received into the counterbore 70 (FIG. 3) in the rear side of the drive member 34 and can be fixedly coupled to the drive member 34 in any desired manner. For example, the cover 37 can be laser welded to the drive member 34.

Each of the bushings 35 can include an annular body portion 210 and a circumferentially extending flange member 212 that can extend radially outwardly from the body portion 210. The bushings 35 can be solid or may be split. A first one of the bushings 35 (i.e., the front bushing) can be assembled to the drive member 34 such that the body portion 210 is received into the inner wall 66 and the flange member 212 is abutted against the front side of the front wall 68, while the second one of the bushings 35 (i.e., the rear bushing) can be assembled to the cover member 200 such that the body portion 210 is received into the annular inner wall 202 and the flange member 212 is abutted against the rear surface of the cover member 200. The annular spacer body 40 of the hub spacer 30 can be received through the cover 37 such that flange member 212 of the rear bushing 35 is abutted against the front side of the annular spacer flange 42 and the rear side of the cover 37. It will be appreciated that the body portion 210 of the rear bushing 35 facilitates rotation of the cover 37 relative to the hub spacer 30. If desired, locking tabs 216 may be formed onto an axial end of the body portion 210 opposite the flange member 212; the locking tabs 216 can be employed to axially retain the bushings 35 to a respective one of the cover 37 and the drive member 34.

The torsional vibration damper 38 can include a damper hub 230, an inertia member 232 and a torsionally resilient coupling 234, such as an elastomer, that can couple the damper hub 230 to the inertia member 232. The damper hub 230 can be received into the annular inner wall 66 of the drive member 34 and one or more threaded fasteners (not specifically shown) can be employed to fixedly couple the damper hub 230, the hub 32 and the hub spacer 30 to the crankshaft 18 for rotation therewith. The body portion 210 of the front bushing 35 can support the drive member 34 for rotation on the damper hub 230, while the flange member 212 can be employed to distribute thrust loads transmitted from the drive member 34 to the damper hub 230. Additionally, a preload member 250 may be employed to take up endplay between the drive member 34 and the hub spacer 30 and/or the damper hub 230. In the particular example provided, the preload member 250 is an annular element that is formed of an elastomer and disposed axially between the front wall 68 of the drive member 34 and the damper hub 230 so as to also form a seal between the damper hub 230 and the front wall 68 of the drive member 34.

Figure 9:
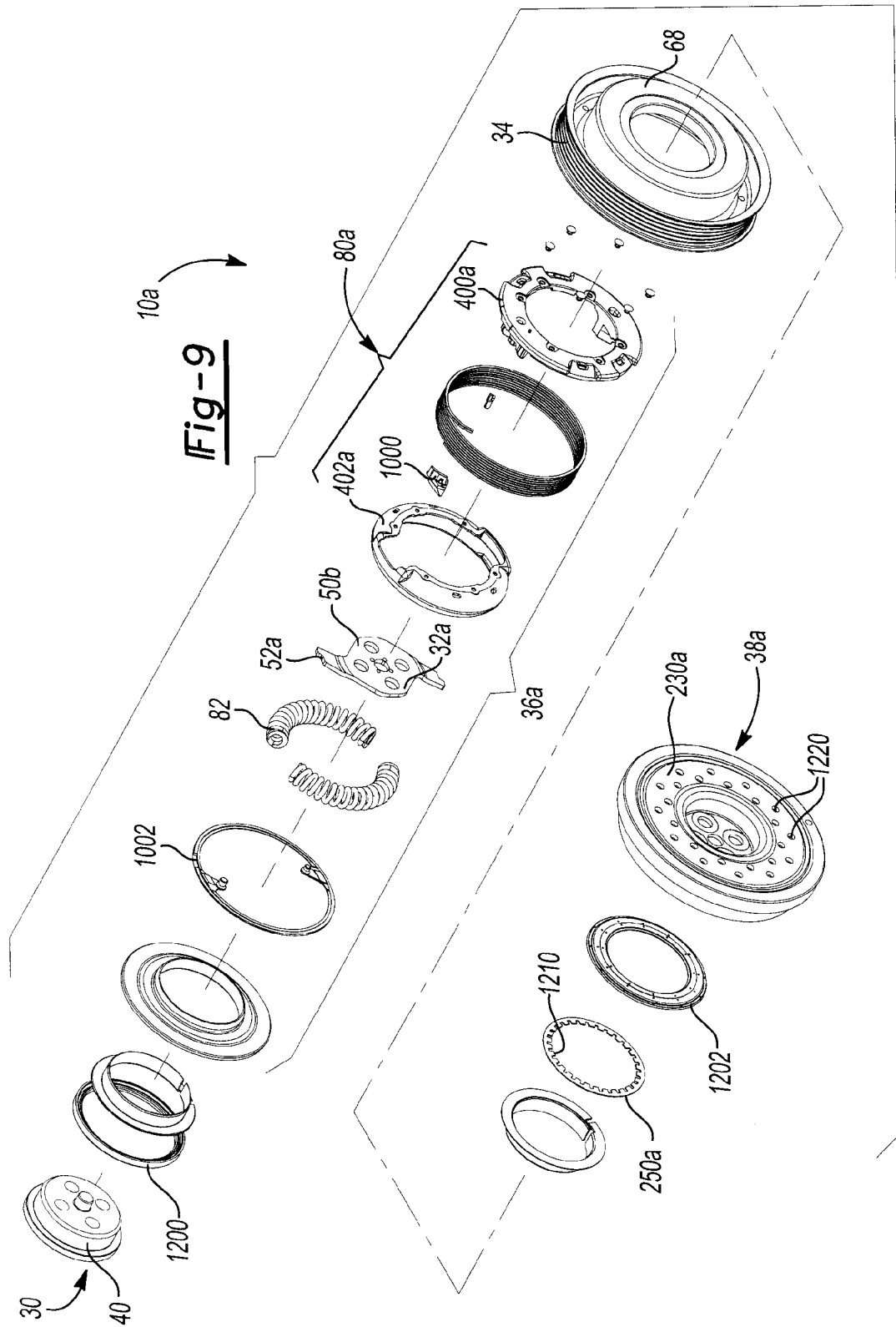
FIG. 9 is an exploded perspective view of a second decoupler constructed in accordance with the teachings of the present disclosure.
Figure 10:
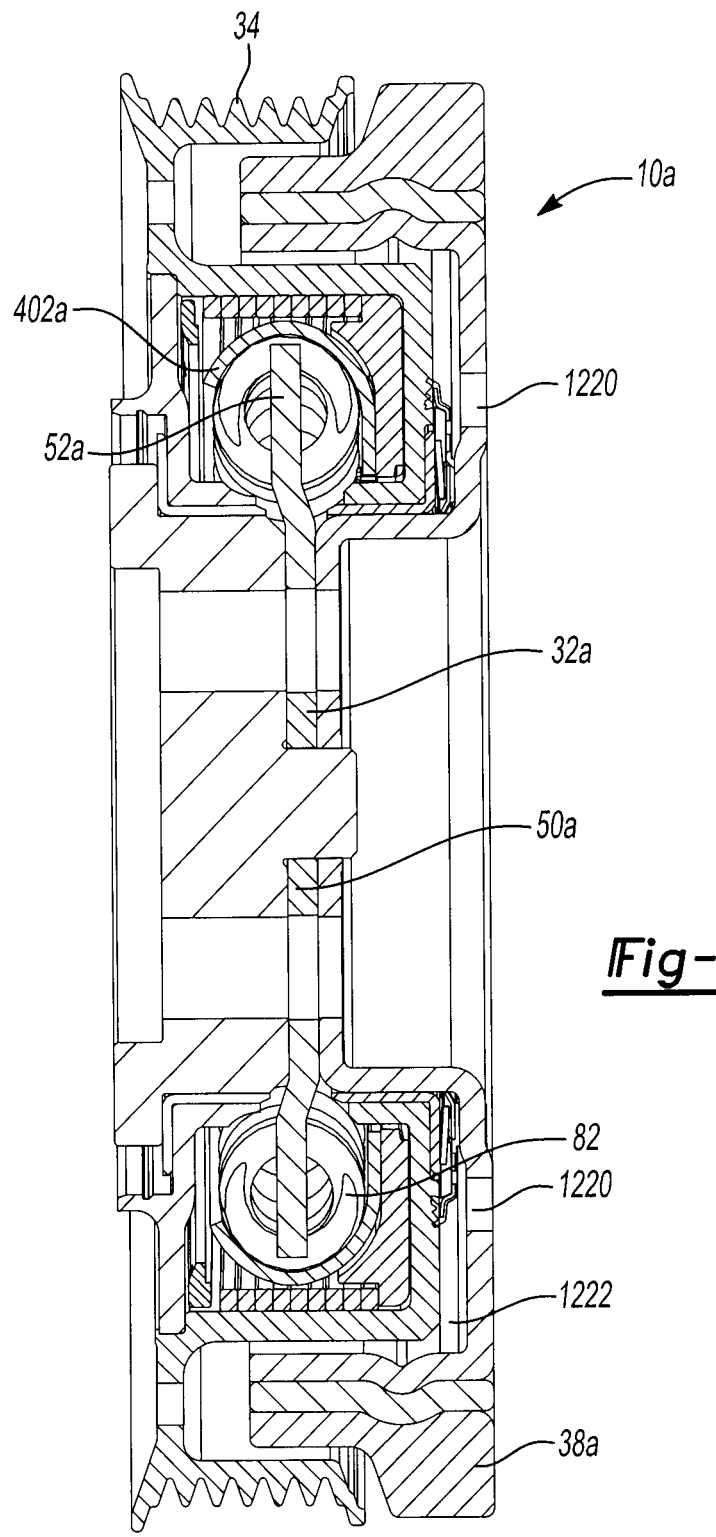
FIG. 10 is a section view of the decoupler of FIG. 9.

With reference to FIGS. 9 and 10 a second decoupler constructed in accordance with the teachings of the present disclosure is generally indicated by reference numeral 10a. The decoupler 10a is generally similar to the decoupler 10 (FIG. 2) discussed in detail above, except that the configuration of the hub 32a, the isolator 36a, the sealing system and the torsional vibration damper 38a are somewhat different than those describe in detail above.

For example, the hub tabs 52a of the hub 32a are offset from the hub body 50a to accommodate a difference in the axial spacing of the arcuate springs 82 from an end of the crankshaft (not shown). It will be appreciated that the hub tabs 52a contact ends of respective ones of the arcuate springs 82 along their center line to thereby reduce or eliminate forces that would tend to push the arcuate springs 82 outwardly from the spring shell 402a. In the particular example provided, the hub tabs 52a are offset in an axial direction to the rear of the hub body 50a. It will be appreciated, however, that the hub tabs 52a could be offset in an axial direction to the front of the hub body 50a.

Returning to FIG. 9, the isolator 36a is generally similar to the isolator 36 (FIG. 2), except that modifications have been made to the carrier assembly 80a. The carrier assembly 80a can include a plate member 400a, a spring shell 402a, a retainer 1000 and an expansion limiter 1002.

Figure 13:
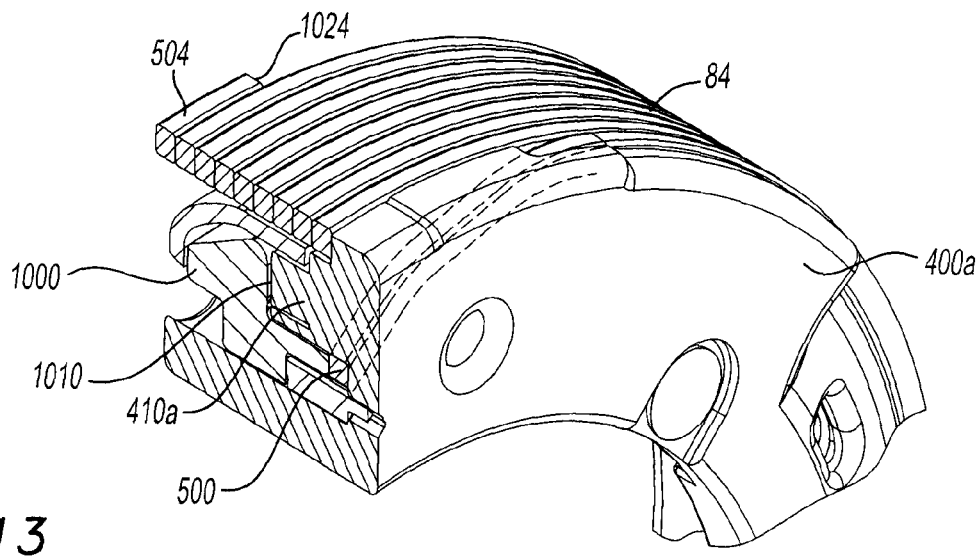
FIG. 13 is a section view of a portion of the decoupler of FIG. 9 illustrating zones of the spring shell and the carrier that are proximate the retainer.
Figure 14:
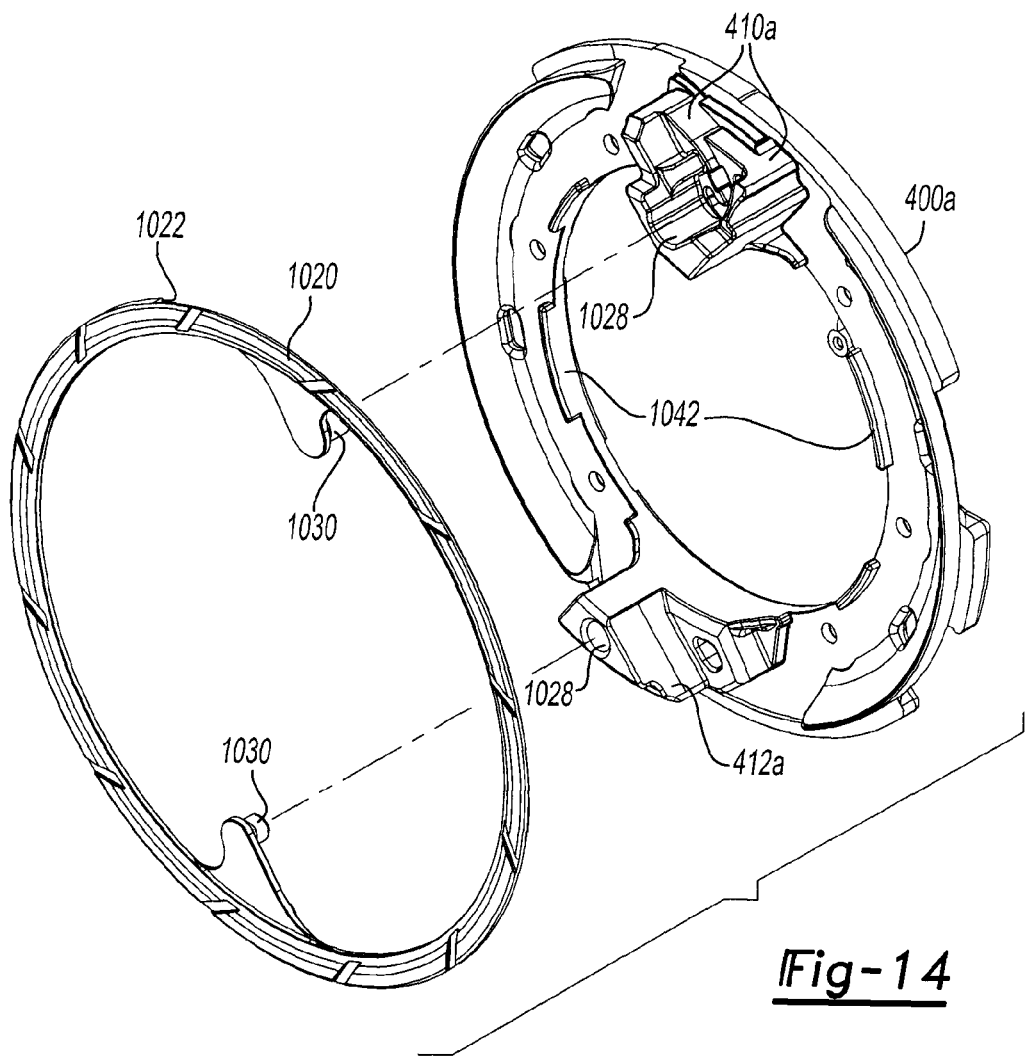
FIG. 14 is an exploded rear perspective view of a portion of the decoupler of FIG. 9 illustrating the connection of the spacer to the carrier.

With reference to FIGS. 13 and 14, the plate member 400a can be generally similar to the plate member 400 (FIG. 2) described above but can include a retainer pocket 1010 in the first reaction block 410a that can be configured to receive the retainer 1000 such that the retainer 1000 is positioned relative to the plate member 400a in a predetermined manner. In particular, the retainer 1000 is configured to overlie the proximal end 500 of the wrap spring 84 and the spring stop (not specifically shown) such that both the proximal end 500 and the spring stop are juxtaposed between the plate member 400a and the retainer 1000.

The expansion limiter 1002 is generally similar to that which is disclosed in International Patent Application Publication No. WO2012/094745 in that it is configured to limit axial expansion of the wrap spring 84 in a predetermined manner. The disclosure of International Patent Application Publication No. WO2012/094745 is incorporated by reference as if fully set forth in detail herein. Briefly, the expansion limiter 1002 can be configured to limit axial elongation of the wrap spring 84 by an amount that is less than a width of the wire that forms the wrap spring 84, such as a dimension that is greater than or equal to 0.1 times the width of the wire to a dimension that is less than or equal to 0.75 time the width of the wire. In the particular example provided, the expansion limiter 1002 is coupled to the plate member 400a for rotation therewith and the expansion limiter 1002 includes a helical lip 1020 and an abutment 1022. The helical lip 1020 abuts an axial end of the wrap spring 84 on a side that is opposite the plate member 400a (such that the wrap spring 84 is juxtaposed with (i.e., between) the plate member 400a and the expansion limiter 1002). The abutment 1022 can be spaced circumferentially apart from an axial end face 1024 of the free end 504 of the wrap spring 84, but can abut the axial end face 1024 of the free end 504 to limit axial expansion of the wrap spring 84 (due to uncoiling of the wrap spring 84).

The plate member 400a can comprise one or more mounting holes 1028 that can be configured to position the expansion limiter 1002 in a predetermined orientation relative to the plate member 400a. In the particular example provided, the expansion limiter 1002 comprises a pair of mounting lugs 1030 that are received into the mounting holes 1028 formed in the first and second reaction blocks 410a and 412a. Alternatively, one of the locating holes 1028 can be formed in the retainer 1000. It will be appreciated that as the expansion limiter 1002 is non-rotatably coupled to the plate member 400a, the free end 504 of the wrap spring 84 need not be coupled to the expansion limiter 1002 for rotation therewith.

Figure 11:
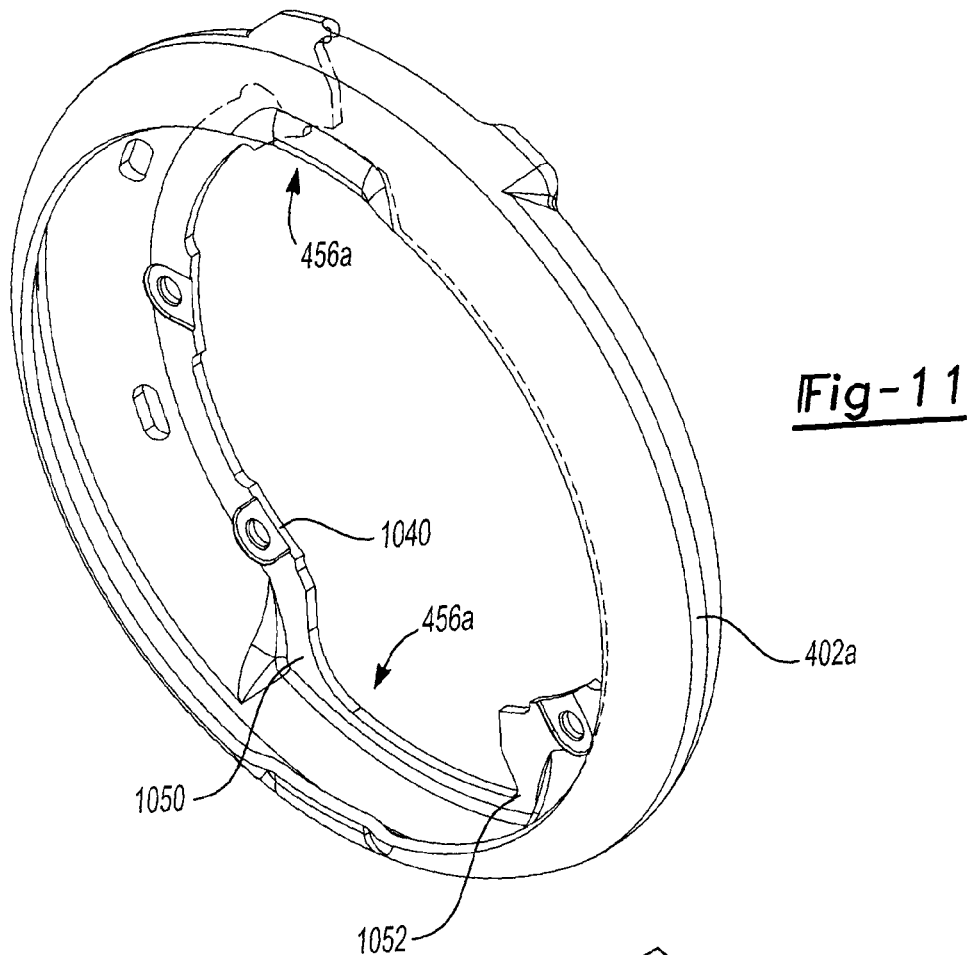
FIG. 11 is a rear perspective view of a portion of the decoupler of FIG. 9 illustrating the spring shell in more detail.
Figure 12:
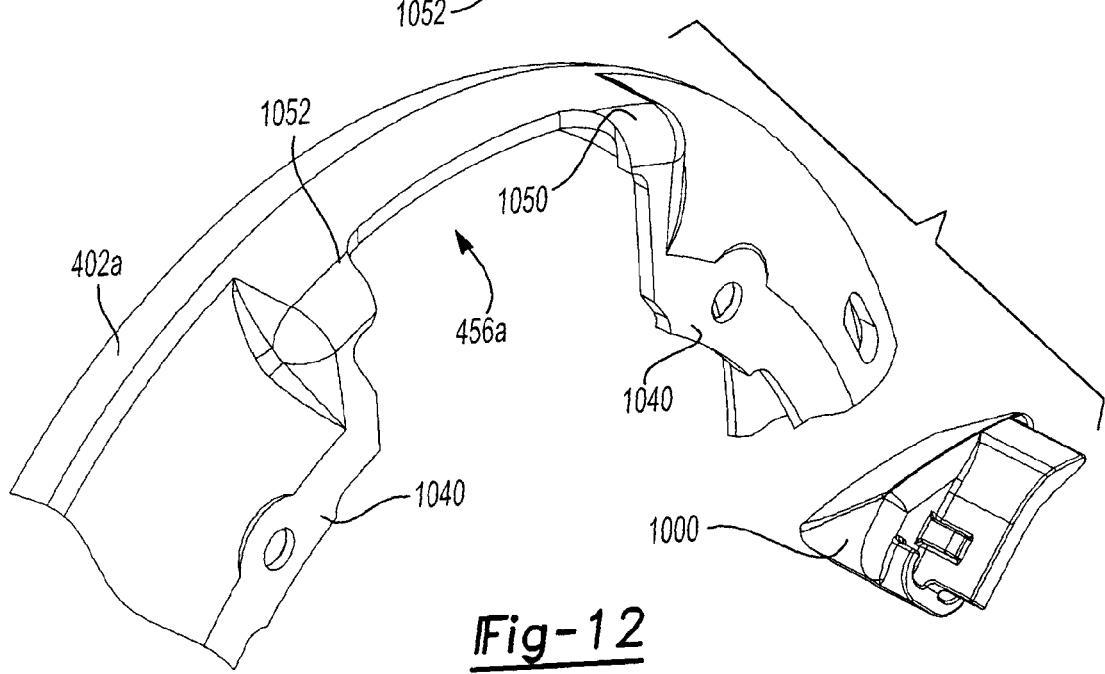
FIG. 12 is a front perspective view of a portion of the decoupler of FIG. 9 illustrating the spring shell and the retainer in more detail.

In FIGS. 11 and 12, the spring shell 402a can be generally similar to the spring shell 402 (FIG. 2), except that for the configuration of the spring shell 402a in the area of the mounting block apertures 456a and the addition of a plurality of radial locating tabs 1040 that can be employed to center the spring shell 402a to a locating ridge 1042 (FIG. 14) formed on the plate member 400a (FIG. 14). The portions of the spring shell 402a that include the mounting block apertures 456a are shaped in a more continuous manner as compared to corresponding portions of the spring shell 402 (FIG. 2). Additionally, the mounting block apertures 456a can be shaped with a trailing end 1050 that is defined by a first radius that is larger than a second radius used to shape a leading end 1052. Configuration in this manner can reduce stresses transmitted through the spring shell 402a.

The sealing system of the decoupler 10a can include a rear seal 1200 and a front seal 1202. The rear seal 1200 can be a radial lip seal that can be press-fit (and sealingly engaged) to the inside surface of the annular inner wall 202 of the cover 37. The rear seal 1200 can comprise a seal element that can sealingly engage annular spacer body 40 of the hub spacer 30. The front seal 1202 can be a face seal that can sealingly engage the front wall 68 of the drive member 34. If desired, the front seal 1202 can be non-rotatably coupled to a preload spring 250a. In the particular example provided, the preload spring 250a is similar to a Belleville spring washer with castellations 1210 formed along its inner diametrical surface and the front seal 1202 includes lugs (not specifically shown) that mating engage the castellations 1210 to inhibit relative rotation between the preload spring 250a and the front seal 1202.

The torsional vibration damper 38a can be generally identical to the torsional vibration damper 38 (FIG. 2), except that a plurality of vent apertures 1220 are formed through the damper hub 230a. The vent apertures 1220 are configured to vent a space 1222 (FIG. 10) between the drive member 34 and the torsional vibration damper 38a to lessen the tendency of the torsional vibration damper 230a to transmit noise during operation of the engine (not shown) that supplies rotary power to the decoupler 10a. It will be appreciated from this disclosure that the use of vent apertures 1220 in the torsional vibration damper 38a is entirely optional and that vent apertures 1220 may be unnecessary in some situations. We have found the vent apertures 1220 be helpful in attenuating noise when the engine that powers the decoupler 10a is a diesel engine. When vent apertures 1220 are desired, the quantity and arrangement of the vent apertures 1220 may be determined empirically through trial and error. It will further be appreciated that similar vent apertures (not specifically shown) can be formed in the drive member 34.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A decoupler comprising:
   a drive member;
   a hub; and
   an isolator that is configured to transmit rotary power between the drive member and the hub in a predetermined rotational direction, the isolator comprising a wrap spring, a plurality of helical coil springs, and a carrier assembly, the wrap spring comprising a plurality of helical coils and a proximal end, the helical coil springs being disposed between the hub and the carrier assembly, the carrier assembly comprising a carrier plate and a spring shell, the carrier plate having a plate member with a rim and a spring groove, the rim abutting an axial end of the wrap spring, the proximal end of the wrap spring being received in the spring groove, the spring shell being assembled to the carrier plate and having a toric inner surface into which the helical coil springs are received.

2. The decoupler of claim 1, wherein the wrap spring is disposed outwardly of the helical coil springs.

3. The decoupler of claim 1, wherein a portion of the spring shell overlies the proximal end of the wrap spring such that the proximal end is juxtaposed between the portion of the spring shell and the carrier plate.

4. The decoupler of claim 1, wherein the hub comprises a hub body and a pair of hub tabs, and wherein the hub tabs are offset from the hub body in a direction that is parallel to a rotational direction of the hub.

5. The decoupler of claim 1, wherein the carrier assembly further comprises fasteners that fixedly couple the carrier plate to the spring shell.

6. The decoupler of claim 1, wherein the carrier plate further comprises a pair of reaction blocks, each of the reaction blocks abutting an end of an associated one of the helical coil springs.

7. The decoupler of claim 6, wherein the isolator further comprises an expansion limiter that is configured to limit growth of the wrap spring in an axial direction that is parallel to a rotational axis of the decoupler.

8. The decoupler of claim 7, wherein the expansion limiter comprises a pair of first mounts that matingly engage second mounts formed in the carrier plate.

9. The decoupler of claim 8, wherein the second mounts are formed in the reaction blocks.

10. The decoupler of claim 6, wherein the carrier shell comprises a pair of block mounting apertures, each of the mounting block apertures being configured to receive an associated one of the reaction blocks.

11. The decoupler of claim 10, wherein each mounting block aperture has a trailing end, which is defined at least partly by a first radius, and a leading end, which is defined at least partly by a second radius, and wherein the first radius is larger than the second radius.

12. The decoupler of claim 1, wherein the isolator further comprises a retainer that is coupled to the carrier plate, and wherein the proximal end of the wrap spring is in juxtaposed relation with both the carrier plate and the retainer.

13. The decoupler of claim 1, wherein the carrier shell comprises a plurality of radial locating tabs that engage a locating ridge formed on the carrier plate to center the carrier shell relative to the carrier plate.

14. The decoupler of claim 1, wherein the spring shell is made from metal.

15. The decoupler of claim 1, wherein the spring shell is made from sheet metal.

16. The decoupler of claim 14, wherein the carrier plate is made from Nylon.

* * * * *